United States Patent
Davis et al.

(10) Patent No.: US 8,417,793 B2
(45) Date of Patent: Apr. 9, 2013

(54) METHOD AND SYSTEM FOR INTERNET ACCESS

(75) Inventors: Bruce L. Davis, Lake Oswego, OR (US); William C. Hein, III, Glenmoore, PA (US)

(73) Assignee: Digimarc Corporation, Beaverton, OR (US)

( * ) Notice: Subject to any disclaimer, the term of this patent is extended or adjusted under 35 U.S.C. 154(b) by 287 days.

(21) Appl. No.: 11/382,427

(22) Filed: May 9, 2006

(65) Prior Publication Data

US 2007/0117584 A1 May 24, 2007

Related U.S. Application Data

(63) Continuation of application No. 09/697,780, filed on Oct. 26, 2000, now abandoned.

(51) Int. Cl.
*G06F 15/16* (2006.01)
(52) U.S. Cl. ........ 709/219; 709/203; 709/217; 709/225; 709/229; 705/52; 705/53
(58) Field of Classification Search .................. 709/217, 709/219, 200, 225, 203, 229; 382/100, 107; 705/114.28, 1, 52, 53; 713/182, 186; 715/500; 725/25; 455/403
See application file for complete search history.

(56) References Cited

U.S. PATENT DOCUMENTS

| | | | |
|---|---|---|---|
| 4,879,747 A | 11/1989 | Leighton et al. | |
| 5,450,490 A | 9/1995 | Jensen et al. | |
| 5,640,193 A | 6/1997 | Wellner | |
| 5,823,879 A * | 10/1998 | Goldberg et al. | 463/42 |
| 5,956,716 A | 9/1999 | Kenner et al. | |
| 6,122,403 A | 9/2000 | Rhoads | |
| 6,148,091 A | 11/2000 | DiMaria | |
| 6,164,534 A * | 12/2000 | Rathus et al. | 235/380 |
| 6,243,450 B1 * | 6/2001 | Jansen et al. | 379/144.01 |
| 6,314,569 B1 | 11/2001 | Chernock et al. | |
| 6,425,010 B1 * | 7/2002 | Alles et al. | 709/225 |
| 6,463,416 B1 | 10/2002 | Messina | |
| 7,054,830 B1 * | 5/2006 | Eggleston et al. | 705/14 |
| 7,140,045 B2 * | 11/2006 | Gudorf et al. | 726/28 |
| 2001/0051996 A1 | 12/2001 | Cooper et al. | |
| 2002/0033844 A1 | 3/2002 | Levy et al. | |
| 2002/0059162 A1 | 5/2002 | Shinoda et al. | |
| 2002/0075298 A1 * | 6/2002 | Schena et al. | 345/738 |
| 2002/0133708 A1 * | 9/2002 | Gudorf et al. | 713/186 |
| 2006/0288072 A1 * | 12/2006 | Knapp et al. | 709/203 |

OTHER PUBLICATIONS

U.S. Appl. No. 60/220,869, filed Jul. 20, 2000.

* cited by examiner

*Primary Examiner* — Frantz Jean
(74) *Attorney, Agent, or Firm* — Digimarc Corporation

(57) ABSTRACT

Costs associated with accessing the internet from a public terminal are borne by one or more sponsors. The terminal thus sponsored may, in exchange, be limited in the internet domains it is capable of browsing. If a user wishes to browse beyond the sponsored domains, a usage charge may be assessed. In other arrangements, web cards (like pre-paid phone cards) may be sold at retail establishments (or issued by libraries), to permit web browsing from compliant terminals. A variety of other arrangements are also detailed.

18 Claims, 2 Drawing Sheets

METHOD AND SYSTEM FOR INTERNET ACCESS

RELATED APPLICATION DATA

This application is a continuation of application Ser. No. 09/697,780, filed Oct. 26, 2000.

The subject matter of the present application is also related to that disclosed in application Ser. No. 09/571,422, filed May 15, 2000 (now U.S. Pat. No. 6,947,571).

FIELD OF THE INVENTION

The present invention relates to non-traditional methods of providing internet access.

BACKGROUND AND SUMMARY OF THE INVENTION

Internet access is becoming ubiquitous. Home, office, and school are no longer the only sites from which users gain access. Increasingly, internet access can also be obtained from terminals at airport kiosks, coffee shops, photocopy centers, city halls, and other non-traditional sites ("public sites").

When accessing the internet from such public sites, users may be required to utilize an Internet Service Provider (ISP) associated with that terminal, or they may be given the option of signing-on using the customary ISP they use at home or work. In either case, a fee is typically charged for such public access.

In accordance with one aspect of the present invention, costs associated with accessing the internet from a public site are borne by one or more sponsors. The internet terminal thus sponsored may, in exchange, be limited in the internet domains it is capable of browsing. For example, if the terminal is sponsored by an automobile manufacturer, the terminal may be limited to browsing that manufacturer's web pages. Browsing of certain other domains may also be permitted (for example, the web pages at the weather.com and cnn.com domains). But browsing of web sites associated with competitors of the sponsor may be restricted.

Some such terminals are equipped with optical input devices, such as web cams, permitting users to present physical objects to the device (e.g., magazine advertisements or product packaging), and be linked to corresponding web pages. Such arrangements are further detailed in the cited '422 application; such optically-based linking services are offered by the present assignee under the Digimarc MediaBridge service mark.

According to another aspect of the invention, web cards (like pre-paid phone cards) may be sold at retail establishments (or issued by libraries), to permit web browsing from compliant terminals. The cards may have fixed or programmable restrictions, e.g., preventing browsing of adult content web sites.

The foregoing and additional features and advantages of the present invention will be more readily apparent from the following detailed description.

DETAILED DESCRIPTION

Figure 1:
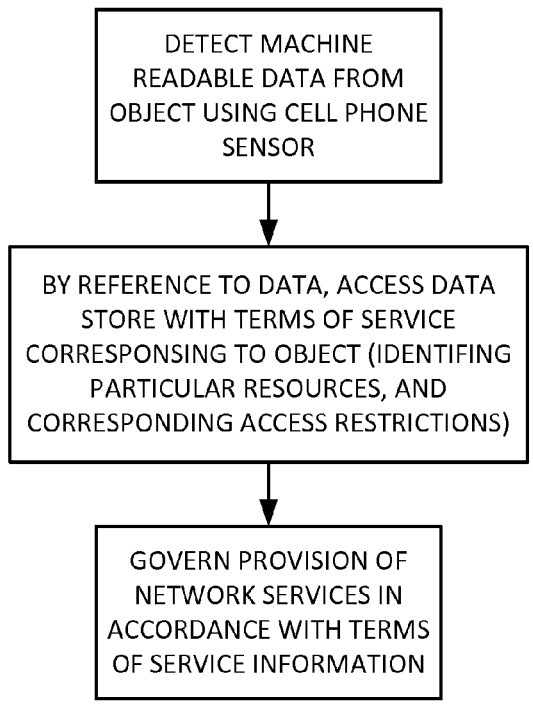
FIGS. 1-4 are flow charts illustrating certain embodiments of the technology.

An internet terminal according to one embodiment of the present invention is a kiosk in an airport terminal. Persons awaiting flights can utilize the terminal to browse internet domains authorized by a sponsor of the unit. For example, if the kiosk is sponsored by Ford Motor Company, the user may be permitted to browse URLs associated with the root domains ford.com, jaguar.com, and volvo.com (i.e., Ford brands). Additionally, browsing of certain non-Ford sites may be sponsored by Ford simply to generate customer goodwill.

The internet connectivity associated with such a terminal may be provided by an ISP that bills Ford a monthly fee. Ford may also pay any telephone line charge or floor space rent associated with such a device. Alternatively, a third party may own and operate the terminal—paying the associated ISP and telephone fees, rent, etc.—and then make the terminal available for Ford's sponsorship in exchange for a fee. The fee can be a set amount per month, or can be related to the volume of usage. Usage models can take various forms. One charges Ford a set amount per minute of actual customer usage. Another charges a set amount each time a link is made to a sponsored (e.g., ford.com) web site. Another charges a set amount for each "user session" (which may be defined as a period of user activity followed by at least two minutes of inactivity). If the sponsored web sites provide opportunities for e-commerce, then a fraction of each sale made through the terminal can be provided to the third party (typically in addition to other fees). A number of other payment arrangements, of course, can be devised.

In some embodiments, the kiosk can be used to browse non-sponsored domains, but at a charge to the user. Thus, if the user attempts to access a URL at the chevrolet.com root domain, the kiosk may solicit a user credit card number to which a time-based access fee can be charged. The fee can be connect-time based (e.g., $1.00 for the first five minutes, and ten cents a minute thereafter); it may vary in accordance with the time of day (e.g., charging a premium rate during high traffic hours), etc.

In addition to use in public places like airports, such terminals can also be used in retail establishments. For example, such a kiosk may be provided in the cosmetics section of a department store. The kiosk may be equipped with a web cam to which customers can present product literature or packaging. The kiosk may be programmed to sense machine-readable data from such literature or packaging (e.g., in the form of digital watermarks) and, based on such data, link to web addresses corresponding to such objects. Again, the kiosk may be arranged to provide such linking free of charge from certain objects (e.g., Revlon products, which lead to web pages at the revlon.com root domain), while providing no linking (or fee-based linking) to other web destinations. Different faces of the product packaging may be encoded with different data, triggering different responses (e.g., different web destinations).

Once a user accesses a first sponsored web page from such a terminal, navigation to second and subsequent web pages may be effected by clicking on hyperlinks on the usual manner (e.g., with a mouse or other pointing device associated with such terminal). In the case just given, if the second web page is also sponsored, then continued no-charge access is provided. However, if the customer attempts to link to a web site associated with a root domain that has not been authorized for no-charge browsing, then the customer may be prompted to enter charge card information, or be blocked from such further browsing.

As detailed in the cited '422 application, linking from objects to corresponding web destinations can be effected by encoding a URL address directly into the machine-readable data sensed from the printed literature or packaging. More commonly, however, the object is encoded with an identifier that is used to access a corresponding URL address stored in a database or other data structure. The database may be remote from the kiosk (e.g., the Digimarc MediaBridge database). In some embodiments, the provider of a remote database receives a usage fee from the kiosk sponsor each time the database is consulted in linking from an object to a sponsored web address. Other compensation arrangements for the database provider, like those payment arrangements discussed earlier, can also be provided.

As noted, the internet terminal may permit access to computer addresses associated with one or more root domains. The authorized domain(s) can be listed in a data record stored in non-volatile storage within the terminal, or at a remote location. (Alternatively, the list can specify domains to which no-charge browsing is not to be permitted, with no-charge browsing permitted to all non-specified domains.) Storing such a list at a remote location allows large systems of such terminals, distributed over wide geographic areas, to utilize a shared list—facilitating administration.

One way of implementing such a shared list is to utilize the same remote system that provides the object identifier-to-URL lookup services. All terminals can route through a proxy server at the remote system that enforces browsing based on the identity of the terminal device which sent the request for a URL. Another approach employs a local proxy server at the terminal, which receives lists of permitted (or forbidden) domains from the remote system. Relatedly, a custom browser can be employed at the terminal that performs domain checking based on information received from the remote system (e.g., employing the standard Windows Inet control). A browser extension can also be employed to manage browsable sites.

Considering the first such approach in more detail, the Digimarc MediaBridge database (that is used to provide URLs corresponding to encoded object identifiers) is also used to specify the internet domains to which no-charge access is to be provided. In such case, the data exchanged between terminal and database (e.g., as detailed in the '422 application) includes data identifying the terminal. The terminal identification data can take various forms. For example, the data can uniquely identify the terminal (e.g., by serial number). Or it can identify the terminal as a member of a class of terminals without uniquely identifying a particular terminal (e.g., CNN Airport News terminals, Kinkos terminals, McDonalds terminals, Qwest terminals, Delta Airlines terminals). Etc. Based on the terminal identification data, the Digimarc MediaBridge database can consult a corresponding data record to determine the root domains to which no-charge browsing from that terminal should be permitted. The data passed back to the terminal can indicate whether a requested link should be provided free of charge.

In some such embodiments, the database evaluates every user-requested link, and signals to the originating terminal, accordingly, whether free access is to be provided. A terminal can cache such information locally for predetermined periods to permit faster evaluation of certain links. For example, if a first customer presents a Revlon lipstick to a kiosk, and the database responds by informing the kiosk that a link to a web site at the revlon.com root domain is to be permitted on a no-charge basis, then this information may be cached for a predetermined period. Thereafter, if a second customer presents the same product to the kiosk, the kiosk first checks the cache. Finding that no-charge linking was earlier permitted from such product, then no-charge linking can be permitted again—without the need to consult the database. (The same cache-based operation can allow free linking from all Revlon products if the products can be locally identified as corresponding to the Revlon root domain, e.g., by caching earlier-determined identifier-to-URL correspondences.)

Another approach to limiting browsing does not rely on identification of the terminal used. Instead, the object identifier with which an object is encoded can point to a record in the Digimarc MediaBridge database that—in addition to identifying the corresponding URL—also specifies further navigation privileges that can be undertaken from within the browser window it launches. Thus, the restriction on browsing can be triggered by the object presented to the computer, rather than whether the computer is a public terminal or a home PC.

The determination whether to provide no-charge internet navigation can be triggered by factors other than the domain to which navigation is requested. For example, an airport internet kiosk can include a 2D optical sensor that images an ID or membership card presented by a user, and extracts machine-readable information from the resulting image data. If, for example, a user presents an Alaska Airlines Platinum VISA credit card, then free access may be permitted. If the user presents an Alaska Airlines MVP membership card, then browsing at a discounted charge may be permitted. If a user presents no card, or a card for which special privileges are not granted, then browsing at full-rate charges may be permitted. (Marking of cards with optically-readable information can be achieved in various ways, e.g., by digital watermarks. Digital watermarking techniques are well known; exemplary techniques are detailed in the present assignee's U.S. Pat. No. 5,862,260 and in application Ser. No. 09/503,881 (now U.S. Pat. No. 6,614,914).) In other such embodiments, optical sensing is not required, and may be replaced by other verification techniques (e.g., mag stripe reading, RF ID, smart card technology, etc.). Although it is possible to permit users simply to type membership numbers at a terminal in order to receive privileged access, such approach may encourage unauthorized sharing of such numbers among users.

More generally, different cards (or other credentials) can be used to enable different classes of internet access. While credit cards, debit card, etc. are used today to obtain internet access, many people do not have such cards (e.g., juveniles). Cards like pre-paid phone cards can be distributed (e.g., sold) to provide internet access from public sites.

One such card may be an Unlimited Net Card, which works everywhere. The card may be unrestricted in its browsing, or restrictions specified by the issuer or the purchaser may be enforced. Restrictions by the user may be specified at the time of purchase (e.g., language/nudity/sex/violence, per RSACi standards), encoded on the card as part of the issuance procedure, and thereafter recognized/respected by the terminal. Or other means can be employed. For example, the first time the card is used, the terminal may be directed to a setup/home page where the user can specify parameters of use. Restrictions on browsing can be specified, e.g., by RSACi or other known internet rating/filtering systems and services. Or browsing can be restricted to certain specified domains entered by the user. Or browsing can be forbidden on certain domains specified by the user. Or combinations of these and other parameters can be employed. All such parameters can then be stored in a card profile record stored in a central database, which is consulted by public terminals each time the card is thereafter used.

Another such card is a Kid Card, which works everywhere, but is content restricted (e.g., as detailed above) per one of several pre-established profiles (e.g., tailored for different age ranges). A feature of the Kid Card is that a tracking report of sites visited may be maintained and provided, via e-mail, to a parent/guardian associated with the card. The parent/guardian email can be specified at time of purchase, or via a setup screen the first time the card is used to access the internet. The email tracking report can be provided on-demand (e.g., by sending an email from the designated email address to a predetermined service), periodically (e.g., weekly), when the card is used-up, etc. Such cards may be issued without charge by libraries, with parental consent, to permit use of library terminals that are not, themselves, content restricted.

Another card is a Sponsored Card, which may provide no-charge access only to certain domains. Such cards may be particularly well suited for issuance by merchants in conjunction with promotions, contests, in store couponing programs, etc. Typically, although not necessarily, such cards are issued free of charge, and may not be exhausted by usage or time.

All such cards may be issued, or backed, by a financial institution—such as a bank or credit card company, but need not be so. When used up, a card can be discarded and a new card bought, or known means can be provided to replenish the card with additional credit. The card typically is issued in fixed increments specified, e.g., in dollars or minutes of access time. Such cards may be distributed in much the same way as prepaid phone cards are now, e.g., from grocery and convenience store checkouts, from vending machines, etc.

Figure 2:
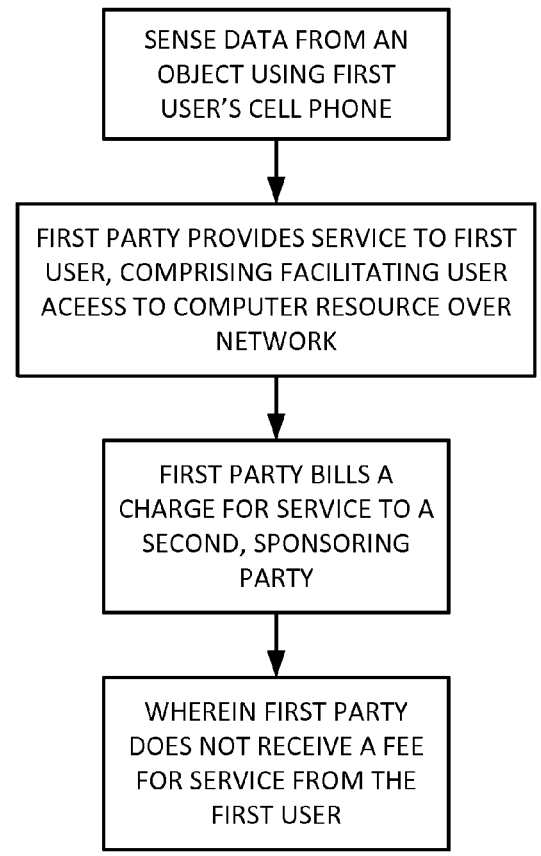
Figure 3:
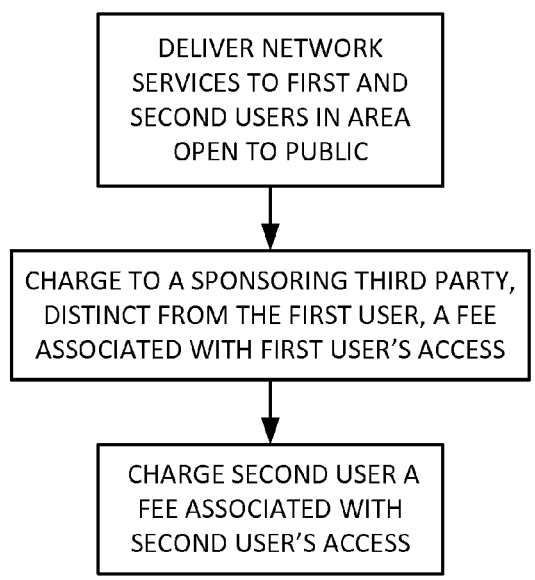
Figure 4:
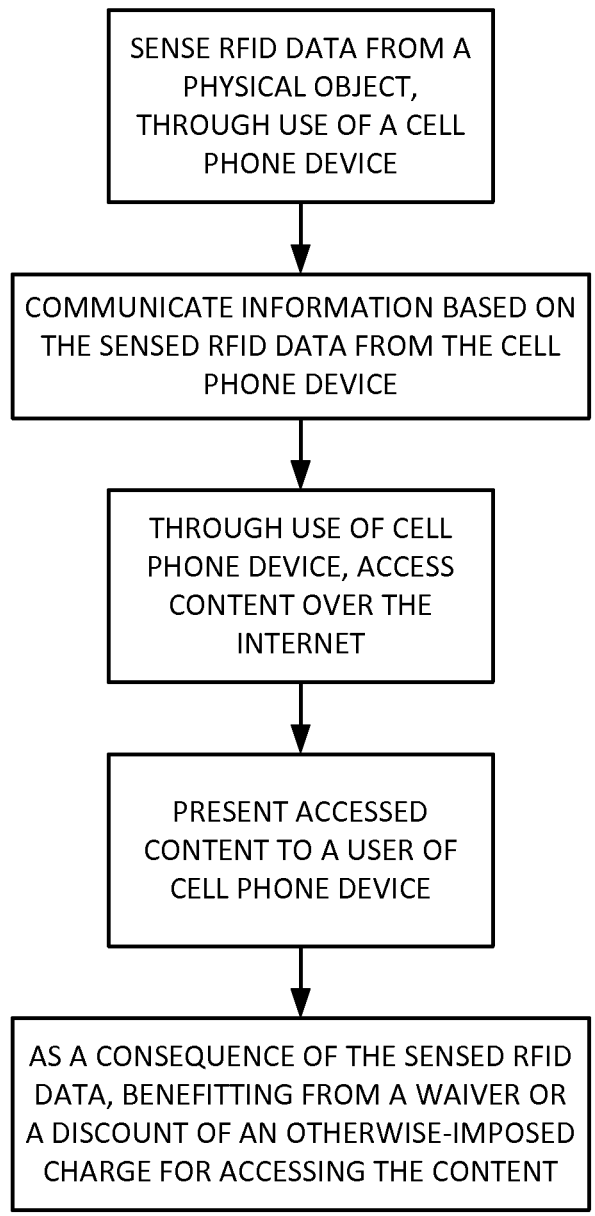

Certain of the methods detailed herein are illustrated by the flowcharts of FIGS. 1-4.

In the foregoing discussion of "cards," other credentials can readily be substituted—both physical and electronic (virtual). An example of the latter is a PIN number that, when purchased, entitles to the buyer to 100 minutes of internet access. (The user my provide the PIN number to the terminal in known ways, e.g., by keypad entry, etc.)

To provide a comprehensive disclosure without unduly lengthening this specification, the patents and applications cited above are incorporated herein by references.

Having described and illustrated the principles of the invention with reference to illustrative embodiments, it should be recognized that the invention is not so limited.

For example, while the detailed description focused on usage of terminals in public places, the invention is not so limited. The same methods can be employed at home or at other traditional sites, with the cost of access for a session being borne by a promoter rather than the user.

While the preferred embodiment employed digital watermarking in conveying data from physical objects to optical sensors, other machine-readable data representations can be used instead (e.g., bar codes, glyphs, RF IDs, mag stripes, smart card technology, etc.).

Still further, while the preferred embodiments generally operate by using an object identifier to access a corresponding database record, and from such record determining a corresponding URL, in other embodiments this need not be the case. Instead, the URL can be directly encoded on the object.

While most of the above-detailed embodiments contemplated that web navigation would be effected by optical sensing of objects presented to the internet terminal, or by clicking on hyperlinks from displayed web pages, other navigation techniques can of course be used, e.g., typing-in a URL, selecting from a list of stored Favorites sites, clicking on GUI buttons, etc. Moreover, while audio prompting has not been detailed, such techniques can be employed to facilitate user interaction with the terminal.

The reference to internet terminals in the foregoing discussion should not be taken as limiting applicability of the invention to any particular form of hardware (e.g., desktop computers or kiosks). Any internet-enabled device or appliance can utilize the principles detailed herein, including cell phones and other wireless devices, personal digital assistants, web-enabled entertainment appliances, etc., etc. Moreover, while full-time internet access by such devices is preferred, the same principles can be employed in other applications, e.g., in which product identifiers are cached when internet access is not available, and utilized (e.g., sent) when access is thereafter provided.

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

We claim:

1. In a method of providing network services, an improvement comprising:
   using a cell phone equipped with a sensor, detecting machine readable data from an object;
   by reference to said machine readable data, accessing a data store containing terms of service information corresponding to said object, said terms of service information identifying particular computer resources or classes of resources, and associating corresponding access restrictions with each; and
   governing the provision of network services in accordance with said terms of service information.

2. The method of claim 1 wherein said object comprises an ID card.

3. The method of claim 1 wherein said restrictions relate to web sites available for browsing by said user.

4. The method of claim 1 wherein said restrictions relate to web sites that can be browsed without charge, versus other web sites for which browsing incurs a fee to be paid by the user.

5. The method of claim 1 that includes preventing access to certain computer resources, by reference to said terms of service information.

6. A method comprising:
   sensing data from an object using a first user's cell phone;
   by reference to the sensed data, a first party providing a service to the first user, said service comprising facilitating user access to a computer resource over a network; and said first party billing a charge connected with said service to a second sponsoring party; wherein the first party does not receive a fee for said service from said first user.

7. The method of claim 6 that includes providing said service for free to a first subset of users who present a first type of access credential to gain access to the service, and charging a fee therefor to a second subset of users who lack said first type of access credential.

8. The method of claim 6 that includes:
providing said service to a first user who presents an object from a certain class of objects; and
to a second user who does not present such an object, providing said service in exchange for a fee.

9. The method of claim 6 that includes providing said service to the first user in response to said user presenting a physical object of a certain class.

10. The method of claim 6 wherein the computer resource serves to promote a product or service offered by said second party.

11. The method of claim 6 wherein said service comprises linking to a computer resource identified by reference to machine readable data sensed from a printed object.

12. A method of providing network services to members of the public, in an area open to the public, the method comprising:
delivering network services to first and second users in said area open to the public; in connection with the first user, charging to a sponsoring third party distinct from said first user a fee associated with said user's access;
and in connection with a second user, charging said user a fee associated with said user's access;
wherein the fee associated with the first user's access is charged to the sponsoring third party because the first user employed a cell phone to sense required data from an object, whereas the second user did not.

13. A method comprising:
with a cell phone, sensing data from a physical object presented by a user;
by reference to said sensed data, accessing a data store having terms of service information related to said physical object; and providing a service to said user, said service comprising facilitating user access to a computer resource over a network, wherein terms of said service are determined by reference to said terms of service information accessed from said data store, said terms of service information identifying particular computer resources or classes of resources, and associating corresponding access privileges or restrictions with each.

14. The method of claim 13, wherein said physical object comprises an ID card.

15. The method of claim 13 in which said service comprises providing access to networked web sites, and said terms of service relate to content-based restrictions on web sites that can be freely accessed.

16. The method of claim 13 in which said service comprises providing access to networked web sites, and said terms of service relate to restrictions on web sites that can be freely accessed based on corporate affiliation, said corporate affiliation being evidenced by the particular physical object presented by the user.

17. The method of claim 13 that includes preventing access to certain computer resources, by reference to said terms of service information.

18. A method for accessing content over the internet on a discounted or free basis, comprising the acts: through use of a cell phone device, sensing RFID data from a physical object; communicating information based on the sensed RFID data from the cell phone device; through use of the cell phone device, accessing content over the internet; and presenting said accessed content to a user of said cell phone device; wherein the method further includes, as a consequence of the sensed RFID data, benefitting from a waiver or a discount of an otherwise-imposed charge for accessing said content.

* * * * *